(12) United States Patent
Kwon et al.

(10) Patent No.: US 9,871,241 B2
(45) Date of Patent: *Jan. 16, 2018

(54) ELECTRODE ASSEMBLY HAVING EXCELLENT DEGREE OF FREEDOM IN SHAPE THEREOF IN THICKNESS DIRECTION, SECONDARY CELL BATTERY, BATTERY PACK, AND DEVICE INCLUDING ELECTRODE ASSEMBLY

(71) Applicant: LG Chem, Ltd., Seoul (KR)

(72) Inventors: Sung-Jin Kwon, Daejeon (KR);
Ki-Woong Kim, Daejeon (KR);
Soon-Ho Ahn, Daejeon (KR);
Dong-Myung Kim, Daejeon (KR);
Young-Hoon Kim, Daejeon (KR);
Sung-Han Yoon, Daejeon (KR);
Seung-Min Ryu, Daejeon (KR)

(73) Assignee: LG Chem, Ltd. (KR)

( * ) Notice: Subject to any disclaimer, the term of this patent is extended or adjusted under 35 U.S.C. 154(b) by 10 days.

This patent is subject to a terminal disclaimer.

(21) Appl. No.: 14/256,275

(22) Filed: Apr. 18, 2014

(65) Prior Publication Data

US 2014/0227579 A1   Aug. 14, 2014

Related U.S. Application Data

(63) Continuation of application No. PCT/KR2013/012276, filed on Dec. 27, 2013.

(30) Foreign Application Priority Data

Dec. 28, 2012  (KR) .................. 10-2012-0157454
Feb. 8, 2013   (KR) .................. 10-2013-0014720

(51) Int. Cl.
*H01M 2/26*    (2006.01)
*H01M 10/0585* (2010.01)
(Continued)

(52) U.S. Cl.
CPC .......... *H01M 2/1673* (2013.01); *H01M 2/26* (2013.01); *H01M 6/46* (2013.01);
(Continued)

(58) Field of Classification Search
CPC .... H01M 2/26; H01M 2/1673; H01M 2/0217; H01M 10/0413; H01M 10/0468;
(Continued)

(56) References Cited

U.S. PATENT DOCUMENTS 6,224,995 B1 * 5/2001 Fauteux ............. H01M 4/0442
                                                          29/623.1
2001/0005561 A1   6/2001 Yamada et al.
(Continued)

FOREIGN PATENT DOCUMENTS

CN    103703601 A    4/2014
JP    2001-028275 A  1/2001
(Continued)

OTHER PUBLICATIONS

Machine translation for Kusachi et al., JP 2010-097730 A.*
(Continued)

*Primary Examiner* — Barbara Gilliam
*Assistant Examiner* — Angela Martin
(74) *Attorney, Agent, or Firm* — Lerner, David, Littenberg, Krumholz & Mentlik, LLP

(57) ABSTRACT

There is provided an electrode assembly having increased degrees of structural freedom in the thickness direction thereof. The electrode assembly includes negative and positive electrodes alternately stacked with separators interposed therebetween, wherein the electrode assembly is formed by stacking N electrode stacks where N is a natural number equal to or greater than 2, each of the electrode stacks comprises electrodes having the same area and stacked with separators interposed therebetween, and neighboring elec-
(Continued)

trode stacks of the electrode stacks have different electrode areas, wherein a first electrode stack of the electrode stacks is formed by stacking unit cells respectively including an odd number of electrodes, and the other electrode stacks stacked on the first electrode are formed by stacking unit cells respectively including an even number of electrodes.

20 Claims, 3 Drawing Sheets

(51) Int. Cl.
    *H01M 10/0525* (2010.01)
    *H01M 10/0583* (2010.01)
    *H01M 10/0587* (2010.01)
    *H01M 6/46* (2006.01)
    *H01M 2/16* (2006.01)
    *H01M 10/04* (2006.01)
    *H01M 2/02* (2006.01)
    *H01M 10/42* (2006.01)

(52) U.S. Cl.
    CPC ... *H01M 10/0413* (2013.01); *H01M 10/0468* (2013.01); *H01M 10/0585* (2013.01); *H01M 2/0217* (2013.01); *H01M 10/0525* (2013.01); *H01M 10/0583* (2013.01); *H01M 10/0587* (2013.01); *H01M 2002/0205* (2013.01); *H01M 2010/4292* (2013.01)

(58) Field of Classification Search
    CPC ......... H01M 10/0585; H01M 10/0525; H01M 10/0583; H01M 10/0587; H01M 6/46
    See application file for complete search history.

(56) References Cited

U.S. PATENT DOCUMENTS

| | | | | |
|---|---|---|---|---|
| 2007/0180686 A1* | 8/2007 | Woo | ...................... | H01F 41/074 29/623.1 |
| 2009/0197160 A1* | 8/2009 | Fujiwara | .................. | H01M 2/18 429/146 |
| 2009/0317700 A1* | 12/2009 | Son | ...................... | H01M 2/1673 429/94 |
| 2011/0104557 A1* | 5/2011 | Watanabe | ............. | H01M 4/131 429/162 |
| 2011/0269010 A1* | 11/2011 | Sawaguchi | ............ | B82Y 30/00 429/144 |
| 2012/0121964 A1 | 5/2012 | Park et al. | | |
| 2013/0011715 A1* | 1/2013 | Lee | ....................... | H01M 4/621 429/144 |
| 2013/0316205 A1* | 11/2013 | Kim | ....................... | H01M 10/02 429/94 |
| 2014/0072850 A1* | 3/2014 | Kwon | ............... | H01M 10/0413 429/94 |

FOREIGN PATENT DOCUMENTS

| | | | | |
|---|---|---|---|---|
| JP | 2001167743 A | | 6/2001 | |
| JP | 2009-540523 A | | 11/2009 | |
| JP | 2010-097730 A | | 4/2010 | |
| JP | 2010097730 A | * | 4/2010 | ............ H01M 10/58 |
| KR | 20030066960 A | | 8/2003 | |
| KR | 20120039469 A | | 4/2012 | |
| KR | 2012-0069977 A | | 6/2012 | |
| KR | 2013-0118716 A | | 10/2013 | |
| WO | 2009/005288 A1 | | 1/2009 | |
| WO | 2013157742 A1 | | 10/2013 | |

OTHER PUBLICATIONS

Office Action from Chinese Application No. 201380003628.0, dated Feb. 27, 2015.

International Search Report from PCT/KR2013/012276, dated Apr. 21, 2014.

Extended Search Report from European Application No. 13836236.3, dated May 26, 2015.

* cited by examiner

ELECTRODE ASSEMBLY HAVING EXCELLENT DEGREE OF FREEDOM IN SHAPE THEREOF IN THICKNESS DIRECTION, SECONDARY CELL BATTERY, BATTERY PACK, AND DEVICE INCLUDING ELECTRODE ASSEMBLY

CROSS-REFERENCE TO RELATED APPLICATIONS

This application claims the priorities of Korean Patent Application No. 2012-0157454 filed on Feb. 8, 2012 and Korean Patent Application No. 2013-0014720 filed on Feb. 8, 2013, in the Korean Intellectual Property Office and the international application No. PCT/KR2013/012276 filed on Dec. 27, 2013, the disclosure of which is incorporated herein by reference.

BACKGROUND OF THE INVENTION

Field of the Invention

The present disclosure relates to an electrode assembly, and more particularly, to an electrode assembly having increased degrees of structural freedom in a thickness direction thereof.

In addition, the present disclosure relates to a secondary battery, a battery pack, and a device including the electrode assembly.

Description of the Related Art

Demand for secondary batteries has markedly increased with the development and increasing usage of mobile devices, and particularly, lithium secondary batteries having high energy density, high operating voltages, easy-to-store characteristics, and relatively long lifespans are widely used as power sources in various electronic products such as mobile devices.

In general, lithium secondary batteries are formed by disposing an electrode assembly and an electrolyte in a battery case and sealing the battery case. In such an electrode assembly, a negative electrode, a porous separator, and a positive electrode may be vertically stacked to form a unit cell, and a plurality of such unit cells are stacked to increase the capacity of a battery.

New types of battery designs are required for recent devices having various structures, and thus it is necessary to develop battery designs according to such varied structures.

SUMMARY OF THE INVENTION

An aspect of the present disclosure may provide an electrode assembly having a stepped portion and an increased degree of structural freedom. In the electrode assembly, at least two electrode stacks are stacked, and electrodes having different polarities are disposed to face each other at the interface between the electrode stacks so as to increase the capacity of the electrode assembly. In addition, a larger electrode of the electrodes is set to be a negative electrode for stability of the electrode assembly.

According to an aspect of the present disclosure, an electrode assembly may include negative and positive electrodes alternately stacked with separators interposed therebetween, wherein the electrode assembly may be formed by stacking N electrode stacks where N is a natural number equal to or greater than 2, each of the electrode stacks may include electrodes having the same area and stacked with separators interposed therebetween, and neighboring electrode stacks of the electrode stacks may have different electrode areas, wherein a first electrode stack of the electrode stacks may be formed by stacking unit cells respectively including an odd number of electrodes, and the other electrode stacks stacked on the first electrode stack may be formed by stacking unit cells respectively including an even number of electrodes.

Electrodes having different polarities may face each other at an interface between the electrode stacks with a separator interposed therebetween, and a larger electrode of the electrodes having different polarities and facing each other may be a negative electrode.

The first electrode stack may be a lowermost or uppermost electrode stack.

The first electrode stack may have a largest electrode area, and an electrode of the first electrode stack facing a neighboring electrode stack may be a negative electrode.

The unit cells of the first electrode stack may include one or a combination of unit cells having a negative electrode/separator/positive electrode/separator/negative electrode structure and a positive electrode/separator/negative electrode/separator/positive electrode structure, and each of the unit cells may be a stacked type unit cell, a stacked and folded type unit cell, or a laminated and stacked type unit cell.

The unit cells including an even number of electrodes may have a negative electrode/separator/positive electrode structure, and each of the unit cells including an even number of electrodes may be a stacked type unit cell, a stacked and folded type unit cell, or a laminated and stacked type unit cell.

The electrode assembly may be a stacked type electrode assembly, a stacked and folded type electrode assembly, or a combination thereof.

Each of outermost electrodes of the electrode assembly may be independently a negative electrode or a positive electrode, and at least one of the outermost electrodes may be a one-side-coated electrode.

According to another aspect of the present disclosure, a secondary battery may include the electrode assembly.

The electrode assembly may be disposed in a battery case, and the battery case may be a pouch or prism type case.

The secondary battery may be a lithium ion secondary battery or a lithium ion polymer secondary battery.

According to another aspect of the present disclosure, a battery pack may include at least two such secondary batteries, and according to another aspect of the present disclosure, a device may include one or more such secondary batteries.

The device may be a cellular phone, a portable computer, a smartphone, a smartpad, a net book, an LEV (light electronic vehicle), an electric vehicle, a hybrid electric vehicle, a plug-in hybrid electric vehicle, or a power storage device.

ADVANTAGEOUS EFFECTS

According to the present disclosure, the electrode assembly may include a first-layer electrode stack constituted by unit cells respectively including an odd number of electrodes and next-layer electrode stacks constituted by unit cells respectively including an even number of electrodes. Therefore, as compared to electrode assemblies including electrode stacks constituted by unit cells respectively including only an odd number of electrodes, the thickness of the electrode assembly of the present disclosure may be freely adjusted in a stacking direction.

Therefore, the heights of batteries using electrode assemblies of the present invention may be freely adjusted according to application conditions.

Furthermore, since battery reactions occur at an interface at which a stepped portion is formed, the capacity and stability of a battery may be improved.

DESCRIPTION OF DRAWINGS

The above and other aspects, features and other advantages of the present invention will be more clearly understood from the following detailed description taken in conjunction with the accompanying drawings, in which.

BEST MODE

Figure 1:
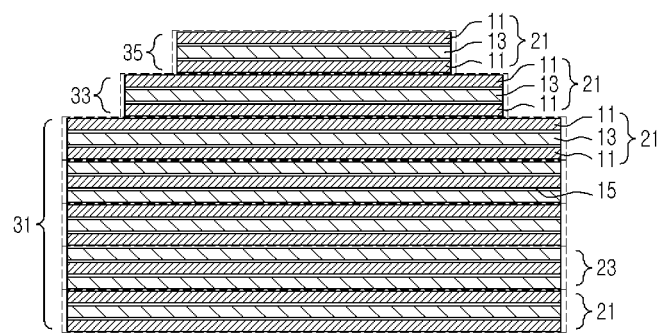
FIG. 1 is a cross-sectional view illustrating an exemplary electrode assembly having stepped portions, the electrode assembly including first and second unit cells respectively having an odd number of electrodes.

The inventors have repeatedly researched electrode assemblies having increased degrees of structural freedom in thickness directions thereof as well as having improved stability and capacity. As a result, the inventors have found that electrode assemblies having various thicknesses in a direction perpendicular to the plane of a device may be easily formed by properly combining unit cells, respectively having an odd number of electrodes, and unit cells, respectively having an even number of electrodes, instead of using unit cells respectively having an odd number of electrodes.

Hereinafter, embodiments of the present disclosure will be described in detail with reference to the accompanying drawings. FIGS. 1 to 4 illustrate exemplary electrode assemblies formed by assembling unit cells.

In an electrode assembly 100 of an embodiment of the present disclosure, N electrode stacks 31 and 33 (where N is a natural number equal to or greater than 2) may be stacked, and each of the electrode stacks 31 and 33 may include electrodes 11 and 13 having the same area and stacked with a separator 15 interposed therebetween. The electrodes 11 and 13 of the neighboring electrode stacks 31 and 33 may have different areas, and the (first) electrode stack 31 may be formed by stacking unit cells 21 and 23 respectively having an odd number of electrodes 11 and 13. The (second) electrode stack 33 disposed on the first electrode stack 31 may include a unit cell 25 having an even number of electrodes 11 and 13.

In the electrode assembly 100 of the embodiment of the present disclosure, the (negative and positive) electrodes 11 and 13 are alternately stacked with the separators 15 interposed therebetween. Although the separators 15 are not referred to or described, it should be understood that the separators 15 are interposed between the negative and positive electrodes 11 and 13.

In the embodiment of the present disclosure, the first electrode stack 31 disposed on the lowest side of the electrode assembly 100 may include unit cells respectively having an odd number of electrodes 11 and 13 and separators 15 interposed between the electrodes 11 and 13. For example, the first electrode stack 31 may include: first unit cells 21 respectively including a positive electrode 13 and negative electrodes 11 disposed on both sides of the positive electrode 13 to form a negative electrode/separator/positive electrode/separator/negative electrode structure; and second unit cells 23 respectively including a negative electrode 11 and positive electrodes 13 disposed on both sides of the negative electrode 11 to form a positive electrode/separator/negative electrode/separator/positive electrode structure. In addition, an electrode stack including only a single unit cell may be used. Furthermore, an electrode stack in which first and second unit cells are stacked in such a manner that negative and positive electrodes 11 and 13 are alternately stacked may be used.

Figure 4:
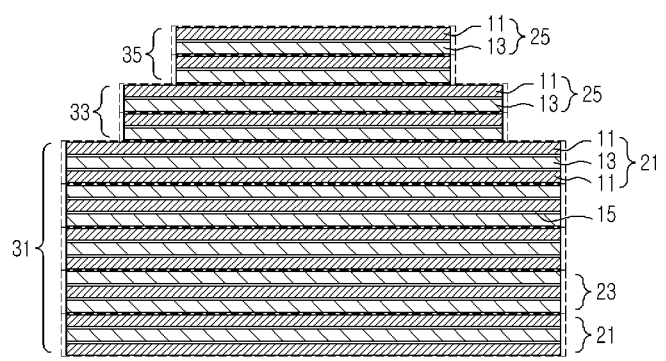
FIG. 4 is a cross-sectional view illustrating an exemplary electrode assembly that includes first unit cells respectively having an odd number of electrodes and second and third unit cells respectively having an even number of electrodes.

In the embodiment of the present disclosure, the outermost electrodes of the electrode assembly 100 may be negative electrodes 11 or may be positive electrodes 13. In FIG. 4, negative electrodes 11 are the outermost electrodes of the electrode assembly 100. This is a non-limiting example. For example, the first electrode stack 31 may include a negative electrode 11 or a positive electrode 13 as one of the outermost electrodes of the electrode assembly 100, and the electrode assembly 100 may include negative and positive electrodes 11 and 13 as outermost electrodes. The outermost electrodes may be one-side-coated electrodes having sides coated with an electrode active material and the other sides (non-coating portions) not coated with the electrode active material. The non-coated sides of the one-side-coated electrodes may be the outermost sides of the electrode assembly 100. In addition, separators 15 may be disposed on the non-coated sides.

For example, the first and second unit cells 21 and 23 of the first electrode stack 31 may be odd numbered. For example, the first and second unit cells 21 and 23 may be stacked in the order of the first unit cell 21/the second unit cell 23/the first unit cell 21/ . . . . In this case, the outermost electrodes of the first electrode stack 31 may be negative electrodes 11. As shown in FIG. 4, since a negative electrode 11 is disposed on the side of the first electrode stack 31 on which the second electrode stack 33 is disposed, precipitation of lithium from an outermost positive electrode 13 may be prevented, and thus the stability of a battery may not be lowered.

The first and second electrode units 21 and 23 may be stacked in the order of the second unit cell 21/the first unit cell 23/the second unit cell 21/ . . . so as to dispose positive electrodes 13 as the outermost electrodes of the first electrode stack 31. In this case, since a positive electrode 13 is disposed on the outermost side of the first electrode stack 31 on which the second electrode stack 33 is disposed, the stability of a battery may be affected by lithium precipitating from the positive electrode 13. Therefore, only a region of the positive electrode 13 facing the second electrode stack 33 may be coated with a positive electrode active material, and the other region of the positive electrode 13 not facing the second electrode stack 33 may not be coated with the positive electrode active material, so as to prevent the precipitation of lithium.

For example, the first and second unit cells 21 and 23 of the first electrode stack 31 may be even numbered. In this case, a negative electrode 11 may be disposed on one of the outermost sides of the first electrode stack 31, and a positive electrode 13 may be disposed on the other of the outermost sides of the first electrode stack 31. In this case, the negative electrode 11 disposed on one of the outermost sides of the first electrode stack 31 may face the second electrode stack 33. However, if the positive electrode 13 disposed on the other of the outermost sides of the first electrode stack 31 faces the second electrode stack 33, a portion of the positive electrode 13 may not be coated with a positive electrode active material as described above. The outermost positive electrode 13 disposed on the other of the outermost sides of the first electrode stack 31 may be a one-side-coated positive electrode. If a negative electrode 11 is disposed on the other of the outermost sides of the first electrode stack 31, the negative electrode 11 may be a double-side-coated or one-side-coated negative electrode.

The second electrode stack 33 is disposed on a side of the first electrode stack 31 with a separator interposed therebetween, and a third electrode stack 35 is disposed on the second electrode stack 33 with a separator interposed therebetween. In this manner, N electrode stacks such as the first to third electrode stacks 31, 33, and 35 may be stacked in the electrode assembly 100 (where N is a natural number). In this case, mutually-facing outermost electrodes of the Mth electrode stack (31 or 33) and the (M+1)th electrode stack (35) neighboring the Mth electrode stack may have different polarities (where M is a natural number smaller than N). Therefore, battery reactions may occur at interfaces at which stepped portions are formed, and thus the capacity of a battery may be increased.

For example, larger electrodes of the mutually-facing electrodes of the Mth electrode stack (31 or 33) and the (M+1)th electrode stack (35) may be negative electrodes 11. Then, precipitation of lithium from a positive electrode 13 may be prevented to maintain the stability of a battery.

The electrode assembly 100 may be formed by combining and stacking first and second unit cells 21 and 23 each formed by disposing electrodes having the same polarity at both sides and disposing an electrode having a different polarity therebetween. For example, when the electrode assembly 100 having stepped portions is assembled, a first electrode stack 31 in which first and second unit cells 21 and 23 having the same area are stacked may be disposed, and a second electrode stack 33 in which first and second unit cells 21 and 23 including electrodes having the same area and smaller than electrodes of the first electrode stack 31 are stacked may be disposed on the first electrode stack 31 with a separator interposed between the first and second electrode stacks 31 and 33. In this case, the electrode assembly 100 may have a stepped portion and upwardly decreasing cross-sectional area.

However, when the electrode assembly 100 is assembled to have a stepped portion as described above, electrodes having the same polarity may face each other at an interface between electrode stacks neighboring each other and forming a stepped portion as shown in FIG. 1. In this case, charging and discharging reactions of a battery may not occur at the interface, and thus the capacity of the battery may be lowered.

Figure 2:
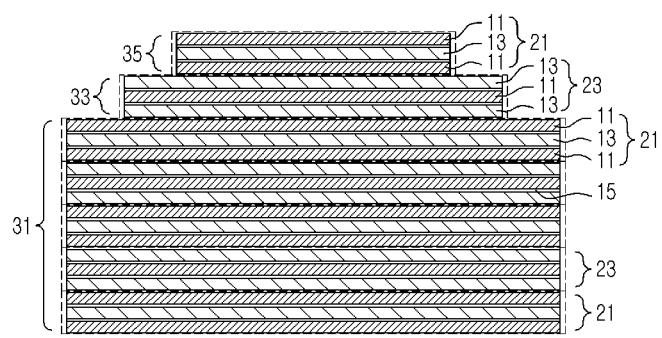
FIG. 2 is a cross-sectional view illustrating another exemplary electrode assembly having stepped portions, the electrode assembly including first and second unit cells respectively having an odd number of electrodes.

In another example, as shown in FIG. 2, an electrode assembly 100 having stepped portions may be assembled by forming electrode stacks using first and second unit cells 21 and 23, and stacking the electrode stacks. In this case, however, a relatively large electrode disposed at an interface between the electrode stacks of the electrode assembly 100 at which a stepped portion is formed may be a positive electrode 13. Thus, lithium may precipitate from a positive electrode active material during charge and discharge reactions of a battery, and the safety of the battery may be lowered.

Figure 3:
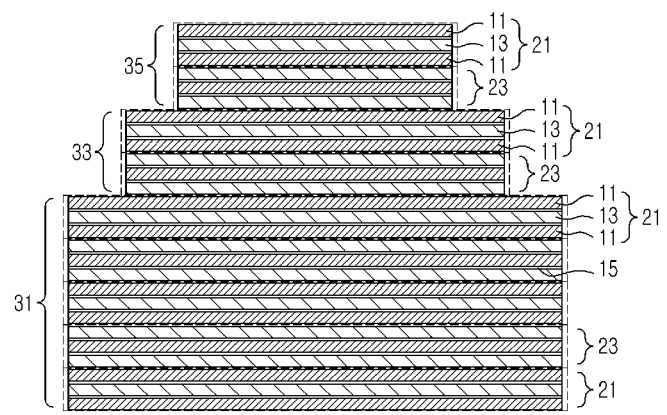
FIG. 3 is a cross-sectional view illustrating another exemplary electrode assembly having stepped portions, the electrode assembly including first and second unit cells respectively having an odd number of electrodes.

For example, as shown in FIG. 3, first and second unit cells 21 and 23 may be stacked in such a manner that larger electrodes disposed at interfaces between electrode stacks may be negative electrodes. In this case, however, each of electrode stacks 33 and 35 stacked on a first electrode stack 31 is required to have an even number of unit cells. Therefore, the electrode assembly 100 may not be used for the case in which the electrode stacks 33 and 35 disposed on the first electrode stack 31 are required to have odd numbers of unit cells. That is, the degree of structural freedom of the electrode assembly 100 may be lowered.

In the embodiment of the present disclosure, the second to Nth electrode stacks 33 and 35 placed on the first electrode stack 31 include unit cells each constituted by an even number of electrodes. That is, the second to Nth electrode stacks 33 or 35 include third units cell 25 each constituted by a negative electrode 11 and a positive electrode 13. Therefore, in the electrode assembly 100, negative electrodes 11 and positive electrodes 13 may be alternately stacked with separators 15 interposed therebetween, and the degree of structural freedom of the electrode assembly 100 may be increased while disposing negative electrodes 11 as larger electrodes at interfaces forming stepped portions.

As described above, the first electrode stack 31 may easily be assembled by using the first and second unit cells each constituted by an odd number of electrodes, and the second and next electrode stacks 33 and 35 may be assembled on the first electrode stack 31 by using the third unit cells 25 each constituted by an even number of electrodes. In this case, the thickness of the electrode assembly 100 may be adjusted according to the shape of a device by properly selecting the number of the third unit cells 25. That is, the degree of design freedom of the electrode assembly 100 may be increased in the thickness direction of the electrode assembly 100.

Furthermore, according to the embodiment of the present disclosure, since the first electrode stack 31 is assembled using the first and second unit cells 21 and 23 each constituted by an odd number of electrodes and the second and next electrode stacks 33 and 35 are assembled using the third unit cells 25 each constituted by an even number of electrodes, negative electrodes 11 may be easily disposed as larger electrodes at interfaces forming stepped portions when the electrode assembly 100 is designed, thereby guaranteeing the stability of a battery and battery reactions at the interfaces for increasing the capacity of the battery.

In the embodiment of the present disclosure, the shape of the electrode assembly 100 is not limited. For example, electrodes constituting the first electrode stack 31 may be the largest electrodes of the electrode assembly 100. That is, as shown in FIG. 4, the areas of electrodes constituting electrode stacks may be reduced in the upward direction from the bottom. In another example, the areas of electrodes constituting electrode stacks may be increased in the upward direction from the bottom. That is, electrodes of the Nth electrode stack may be the largest electrodes in the electrode assembly 100.

In the embodiment of the present disclosure, the first to third unit cells 21, 23, and 25 constituting the electrode stacks 31, 33, and 35 may be stacked type unit cells in which electrodes are sequentially stacked with separators 15 interposed therebetween.

In another example, the first to third unit cells 21, 23, and 25 may be laminated and stacked type unit cells. The laminated and stacked type unit cells may be formed of a plurality of electrodes and a plurality of separators by disposing separators between electrodes and on at least one of the topside and bottom side of the electrodes, and pressing the electrodes. For example, the laminated and stacked type unit cells may have a structure in which a separator is disposed on one of the outermost sides, such as a separator/positive electrode/separator/negative electrode structure or a positive electrode/separator/negative electrode/separator structure. In another example, the laminated and stacked type unit cells may have a structure in which separators are disposed on both the outermost sides such as a separator/positive electrode/separator/negative electrode/separator structure. As compared to stacked type unit cells, the laminated and stacked type unit cells may have a stabler electrode stack structure because electrodes and separators are bonded to each other.

Figure 5A:
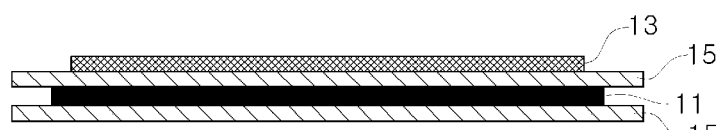
FIGS. 5A and 5B are views illustrating exemplary laminated and stacked type unit cells.
Figure 5B:
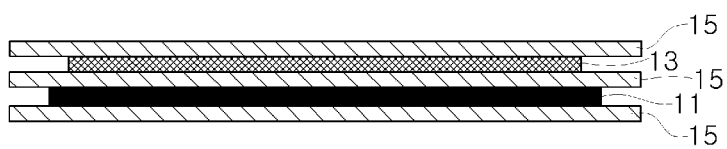

Exemplary laminated and stacked type unit cells are shown in FIGS. 5A and 5B. FIG. 5A illustrates a laminated and stacked type unit cell including the same number of electrodes and separators, and FIG. 5B illustrates a laminated and stacked type unit cell including separators on both sides thereof. However, the illustrated laminated and stacked type unit cells are non-limiting examples. That is, the numbers of electrodes and separators may be varied according to application conditions.

Figure 6A:
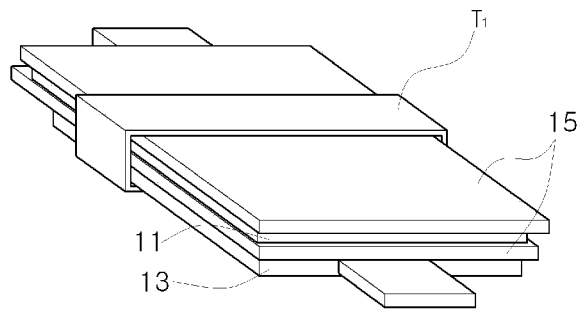
FIGS. 6A and 6B are views illustrating exemplary laminated and stacked type unit cells to which fixing members are attached.
Figure 6B:
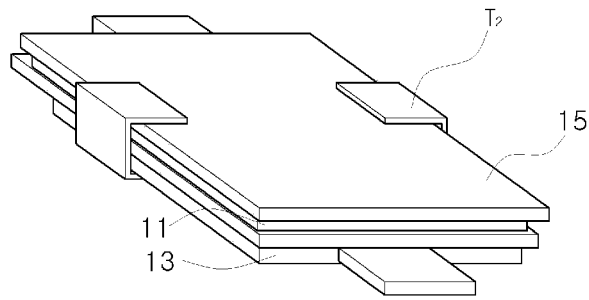

Fixing members such as tape may be used to improve the stability of laminated and stacked type unit cells. For example, as shown in FIG. 6A, a laminated and stacked type unit cell may be entirely wound with a fixing member $T_1$ such as tape, or as shown in FIG. 6B, a laminated and stacked type unit cell may be fixed by fixing members $T_2$ attached to lateral sides thereof.

Alternatively, the first to third unit cells 21, 23, and 25 may be stacked and folded type unit cells (such as winding type unit cells folded in one direction or Z-folding type unit cells folded in a zigzag manner) formed by arranging negative electrodes and positive electrodes on a long rectangular separator and folding the separator together with the negative and positive electrodes. One or a combination of the above-described types of unit cells may be used. However, the first to third unit cells 21, 23, and 25 are not limited to a particular type.

As described above, the electrode assembly 100 is assembled using N electrode stacks as follows: an electrode stack (for example, the first electrode stack 31) constituted by first and second unit cells 21 and 23 respectively including an odd number of electrodes is disposed on the lowest side, and the next electrode stacks (that is, the second to Nth electrode stacks) constituted by third unit cells 25 respectively including an even number of electrodes are disposed on the first electrode stack 31. Therefore, the degree of structural freedom of the electrode assembly 100 may be increased in the thickness direction of the electrode assembly 100, and thus the electrode assembly 100 may be easily shaped according to the shape of a device in which the electrode assembly 100 will be used.

In addition, the electrode assembly 100 of the embodiment of the present disclosure may be a stacked type electrode assembly in which the electrode stacks 31, 33, and 35 are sequentially stacked in a vertical direction or a stacked and folded type electrode assembly in which the electrode stacks 31, 33, and 35 are arranged on a rectangular separator and folded together with the separator. However, the electrode assembly 100 is not limited thereto. The stacked and folded type electrode assembly may be a winding type electrode assembly folded in one direction or a Z-folding type electrode assembly folded in a zigzag manner.

In addition, the first, second, and third unit cells 21, 23, and 25 constituting the electrode stacks 31, 33, and 35 may be arranged on a rectangular separator and may be folded together with the separator to form the electrode assembly 100 having stepped portions.

According to an embodiment of the present disclosure, a lithium ion secondary battery or lithium ion polymer secondary battery may be manufactures using the above-described electrode assembly 100. In this case, the electrode assembly 100 may be disposed in a battery case, and the battery case may be a pouch or prism type battery case.

In addition, according to embodiments of the present disclosure, a battery pack including at least two battery cells respectively including the electrode assembly 100 may be manufactured, and a device may include one or more of such battery cells may be used. Examples of the device may be a cellular phone, a portable computer, a smartphone, a smartpad, a net book, an LEV (light electronic vehicle), an electric vehicle, a hybrid electric vehicle, a plug-in hybrid electric vehicle, and a power storage device.

What is claimed is:

1. An electrode assembly comprising negative and positive electrodes alternately stacked with separators interposed therebetween,
    wherein the electrode assembly is formed by stacking N electrode stacks where N is a natural number equal to or greater than 2, each of the electrode stacks comprises electrodes having the same area and stacked with separators interposed therebetween, wherein a first, lowermost electrode stack of the electrode stacks is formed by stacking unit cells respectively comprising an odd number of electrodes, the unit cells including a first unit cell and a second unit cell which have different structures from each other, and a second electrode stack and a third electrode stack which have smaller sizes than the first electrode stack stacked on the first electrode stack are formed by stacking third unit cells respectively comprising an even number of electrodes;
    wherein electrodes having different polarities face each other at an interface between the electrode stacks with a separator interposed therebetween, and a larger electrode of the electrodes having different polarities and facing each other is a negative electrode;
    wherein four corners of the second electrode stack are apart from four corners of the first electrode stack toward the center of the second electrode stack;
    wherein at least one unit cell is a laminated and stacked type unit cell that is entirely wound with a fixing member such that the fixing member is in contact with four sides of the laminated and stacked type unit cell to improve the stability of the laminated and stacked type unit cell; and
    wherein the fixing member comprises at least one angulated portion corresponding to at least one angulated portion of the unit cell wound with the fixing member.

2. The electrode assembly of claim 1, wherein the first electrode stack has a largest electrode area, and an electrode of the first electrode stack facing a neighboring electrode stack is a negative electrode.

3. The electrode assembly of claim 1, wherein the first unit cell comprises one or a combination of unit cells having a negative electrode/separator/positive electrode/separator/negative electrode structure, and wherein the second unit cell comprises one or a combination of unit cells having a positive electrode/separator/negative electrode/separator/positive electrode structure.

4. The electrode assembly of claim 3, wherein each of the unit cells is a stacked type unit cell, a stacked and folded type unit cell, or a laminated and stacked type unit cell.

5. The electrode assembly of claim 1, wherein the third unit cells have a negative electrode/separator/positive electrode structure.

6. The electrode assembly of claim 5, wherein each of the unit cells comprising an even number of electrodes is a stacked type unit cell, a stacked and folded type unit cell, or a laminated and stacked type unit cell.

7. The electrode assembly of claim 1, wherein the electrode assembly is a stacked type electrode assembly, a stacked and folded type electrode assembly, or a combination thereof.

8. The electrode assembly of claim 1, wherein each of outermost electrodes of the electrode assembly is independently a negative electrode or a positive electrode.

9. A secondary battery comprises the electrode assembly of claim 1.

10. The secondary battery of claim 9, wherein the electrode assembly is disposed in a battery case.

11. The secondary battery of claim 9, wherein the battery case is a pouch or prism type case.

12. The secondary battery of claim 9, wherein the secondary battery is a lithium ion secondary battery or a lithium ion polymer secondary battery.

13. A battery pack comprising at least two secondary batteries as claimed in claim 9.

14. A device comprising at least one secondary battery of claim 9.

15. The device of claim 14, wherein the device is a cellular phone, a portable computer, a smartphone, a smartpad, a net book, an electric vehicle, or a power storage device.

16. The device of claim 1, wherein no two electrode stacks have the same area.

17. The device of claim 1, wherein the electrode stacks progressively decrease in area from the lowermost electrode stack to an uppermost electrode stack.

18. The device of claim 1, wherein the electrode stacks include three electrode stacks having three distinct and progressively decreasing areas.

19. The device of claim 1, wherein the fixing member includes tape.

20. The device of claim 1, wherein the fixing member includes a single piece of tape wrapped around the at least one unit cell.

* * * * *